United States Patent
Violi et al.

[11] Patent Number: 6,120,819
[45] Date of Patent: Sep. 19, 2000

[54] METHOD FOR INSTITUTIONAL DISTRIBUTION OF MEALS

[75] Inventors: Jean-Charles Violi; Raymond Violi, both of Marlens; Jean-François Ferbus, Seythenex, all of France

[73] Assignee: Societe Cooperative de Production Bourgeois, Faverges, France

[21] Appl. No.: 09/293,121

[22] Filed: Apr. 16, 1999

Related U.S. Application Data

[62] Division of application No. 09/080,123, May 15, 1998, Pat. No. 5,910,210.

[30] Foreign Application Priority Data

May 16, 1997 [FR] France ................................... 97 06359
Aug. 4, 1997 [FR] France ................................... 97 10181

[51] Int. Cl.[7] .................................................. A21D 6/00
[52] U.S. Cl. ......................... 426/243; 426/244; 426/390; 99/483; 219/386
[58] Field of Search ..................... 426/390, 243, 426/244; 99/483, 340, 448, 451, 470; 219/386, 620, 622; 165/64

[56] References Cited

U.S. PATENT DOCUMENTS

| | | | |
|---|---|---|---|
| 3,924,100 | 12/1975 | Mack et al. ............................. | 219/386 |
| 3,974,358 | 8/1976 | Goltsos . | |
| 4,020,310 | 4/1977 | Souder, Jr et al. ................. | 219/10.49 |
| 4,093,041 | 6/1978 | Davis et al. ............................... | 186/1 |
| 4,110,587 | 8/1978 | Souder et al. ....................... | 219/10.49 |
| 4,323,110 | 4/1982 | Rubvbright et al. ....................... | 165/2 |
| 4,386,703 | 6/1983 | Thompson et al. ..................... | 206/557 |
| 5,086,834 | 2/1992 | Grandi . | |
| 5,182,438 | 1/1993 | Oakes et al. . | |
| 5,245,150 | 9/1993 | Grandi . | |
| 5,273,360 | 12/1993 | Wyatt et al. . | |
| 5,281,426 | 1/1994 | Pardo ...................................... | 426/232 |
| 5,285,051 | 2/1994 | DeGrow et al. . | |
| 5,403,997 | 4/1995 | Wimpee et al. . | |
| 5,424,427 | 6/1995 | Arnost . | |
| 5,466,915 | 11/1995 | Meier et al. . | |
| 5,505,122 | 4/1996 | Gerrit . | |
| 5,603,858 | 2/1997 | Wyatt et al. . | |
| 5,628,241 | 5/1997 | Chavanaz et al. . | |

FOREIGN PATENT DOCUMENTS

| | | |
|---|---|---|
| 2349112 | 11/1977 | France . |
| 238637 | 10/1978 | France . |
| 2442035 | 6/1980 | France . |
| 2604882 | 4/1988 | France . |
| 2738136 | 7/1997 | France . |
| 2711088 | 9/1978 | Germany . |
| 3125842 | 1/1983 | Germany . |
| 3637660 | 5/1987 | Germany . |
| 4303199 | 8/1994 | Germany . |
| 19507083 | 5/1996 | Germany . |

*Primary Examiner*—Nina Bhat
*Attorney, Agent, or Firm*—Ratner & Prestia

[57] ABSTRACT

Meals are placed on individual trays in an institutional kitchen. The individual trays have a first part carrying the meal portion intended to be eaten hot and covered with a thermally insulative cloche and a second part carrying the meal portion intended to be eaten cold. The individual trays are transported in a thermally insulated enclosure to the places where the meals are to be eaten, where they are distributed into local individual units having a thermally insulated enclosure. Each individual unit includes retractable contact terminals operated by an electromagnet and contacting external terminals on the cloche which are in turn electrically connected to an electrical heating element of the cloche. Accordingly, by supplying power to the contact terminals, the meal portions intended to be eaten hot and placed under the cloches are selectively heated. The device is relatively inexpensive and facilitates meal handlings in compliance with hygiene conditions.

20 Claims, 6 Drawing Sheets

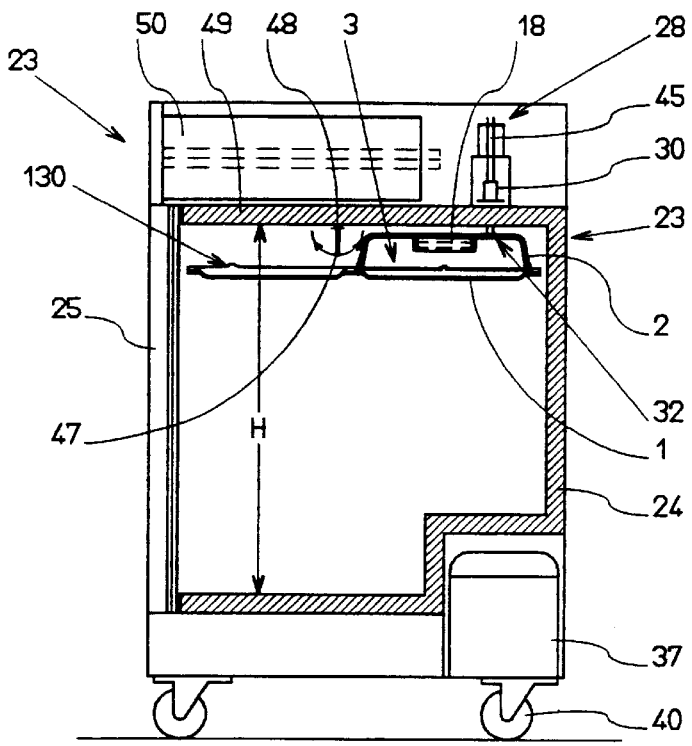
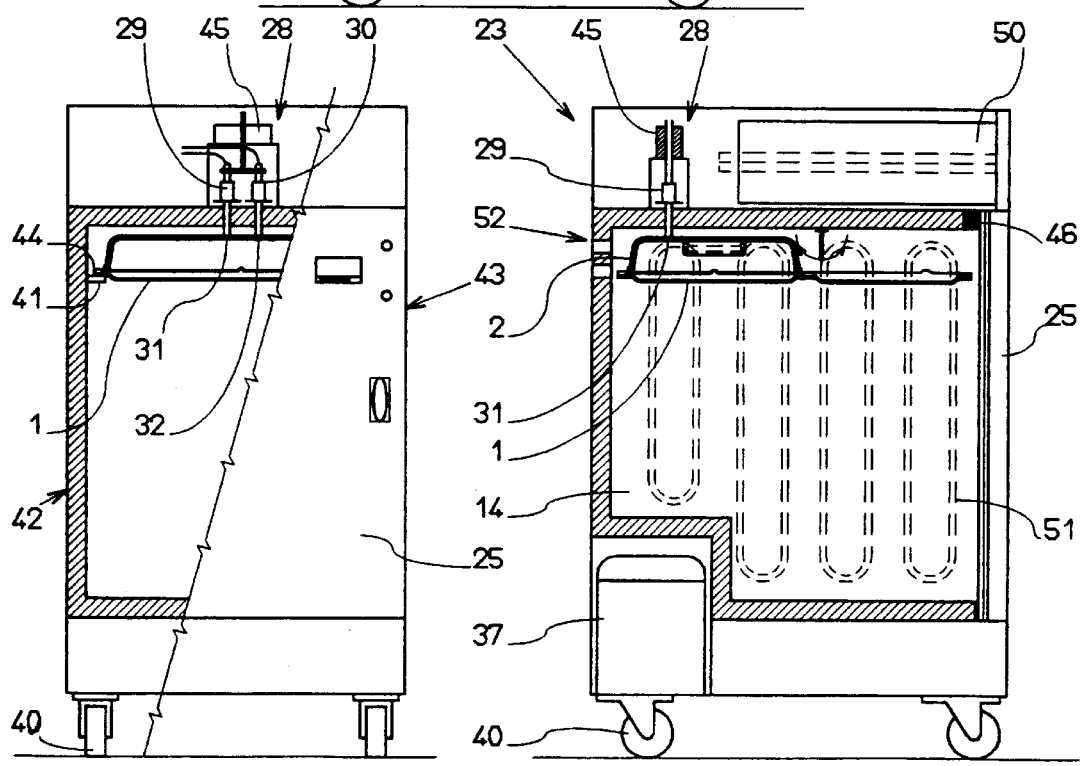
Fig. 7
Fig. 8
Fig. 9

METHOD FOR INSTITUTIONAL DISTRIBUTION OF MEALS

This application is a division of application No. 09/080,123, filed May 15, 1998, now U.S. Pat. No. 5,910,210.

BACKGROUND OF THE INVENTION

1. Field of the Invention

The present invention concerns methods and devices for chilled distribution and heating of foods, in particular foods disposed on meal trays originating from institutional kitchens in which they are prepared.

2. Description of the Prior Art

Devices for the distribution and packaging of meals produced by institutional kitchens are already known in themselves, in particular the device described in document FR 2 442 035 A, in which the foods are prepared in an institutional kitchen where they are placed on trays having a first part for foods intended to be eaten hot and a separate second part for foods intended to be eaten cold. The trays are placed on a special manually propelled thermally insulated institutional cart which has a slotted vertical wall for separating and insulating the cold areas of the trays relative to the hot areas of the trays and which can be coupled to a fixed station for blowing hot or cold air. By coupling the cart to this station, pre-prepared meals can be kept chilled and the portion intended to be eaten hot can be heated before the trays are distributed.

In document FR 2 383 637 A corresponding to U.S. Pat. No. 4,020,310 A, U.S. Pat. No. 4,110,587 A and DE 27 11 088 A, the foods to be heated are placed on the trays on plastics material plates the top face of which is covered with a thin aluminum dish and which receive a removable insulative cover the inside face of which is covered with a metal film. Some ten trays are supported in a thermally insulated institutional cart, one below the other and with an appropriate distance between them, and a series of induction shelves attached to a fixed station to which the cart can be coupled are inserted between the successive trays in the tray heating area. High-frequency alternating current is passed through the induction coils to generate a high-frequency alternating magnetic field that heats by magnetic induction the aluminum dish covering the plate and the metallic bottom face of the cover.

These prior art institutional distribution devices using an institutional thermally insulated cart and a fixed station have a number of drawbacks. Firstly, all the trays on the same cart are heated simultaneously, so that they must necessarily be distributed simultaneously, with no possibility of varying meal times to suit different persons. Next, the distribution of the trays necessitates the intervention of personnel who must therefore be available at meal times, with no possibility of shifting the working times of personnel relative to meal times. Also, the carts necessarily have a complex structure, thermally insulated relative to the exterior and with additional thermal insulation between the parts of the trays to remain cold and the parts of the trays carrying the foods to be heated. The device is therefore costly to manufacture and to use. Also, at meal times, the personnel has to distribute the trays to a number of persons. The usual distribution conditions make this a relatively lengthy process and necessitate transporting foods exposed to the air, with the result that hygiene conditions are not generally respected.

The same drawbacks are found in the device described in document FR 2 349 112 A in which two carts each carrying some twenty meal trays are introduced into a refrigerated enclosure. Electrical elements embedded in each tray heat the food intended to be eaten hot. Heating of the tray by the electrical elements that it contains inevitably causes unacceptable heating of the food intended to be eaten cold.

Document FR 2 604 882 A discloses an individual unit for storing and heating meals for distribution ahead of meal times in institutions. This device is an individual closed enclosure delimited by a thermally insulative peripheral wall and provided with an access door. Its interior space is divided into a plurality of small compartments insulated from each other by fixed insulative walls, at least two compartments being cooled by a refrigerator unit, one of the two cooled compartments being adapted to be heated by a heater. With a device of this kind, personnel can distribute meals ahead of meal times and meal times can be chosen individually for each person. However, hot and cold foods cannot be packaged on the same meal tray inside the device. At meal distribution time, the personnel must introduce the foods to remain cold and the foods to be heated separately into the respective compartments. This makes distribution more complex and entails the risk of errors being made. Moreover, at meal times, the person eating the meal must take out the hot foods and the cold foods separately, possibly to place them on a tray. These operations entail the risk of burns through contact with the hot plates and require sufficient capability and agility of the person eating the meal, which limits the applications of the device, in particular in the distribution of meals in hospitals.

The problem addressed by the present invention is that of designing a new method and a new device structure for storing, distributing and packaging meals from institutional kitchens enabling storage of meals previously prepared on trays having a first part for food intended to be eaten hot and possibly a separate second part for food intended to be eaten cold, enabling uninterrupted refrigeration during distribution of meal trays from the institutional kitchen to the persons eating the meals. Following distribution of meal trays, which can take place ahead of meal times, all the foods must be kept cool at an appropriate storage temperature, after which the foods intended to be eaten hot must be heated without requiring any other operation immediately prior to the individual meal time, the foods intended to be eaten cold remaining at an appropriate cool temperature. The person eating the meal must be able to obtain their meal tray without any additional action on the part of the distribution personnel.

To comply with hygiene requirements, it is important to prevent the growth of bacteria on the foods. The problem is to assure hygienic conditions whilst providing the persons eating meals with hot food at a temperature around 65° C. throughout the food and cold food at a temperature around 8° C. throughout the food.

Another problem addressed by the present invention is that of reducing the cost of the equipment required for institutional distribution of meals, in particular by avoiding the use of costly special-purpose carts, and facilitating the use of the equipment by providing a specific method avoiding difficult manipulation of foods during distribution and eating of meals, freeing up the distribution personnel from time constraints and enabling persons lacking in agility to obtain their meals themselves.

SUMMARY OF THE INVENTION

To achieve the above and other objects, the invention provides a device for storing and packaging prepared foods on transportable trays having a first part adapted to be covered by a removable insulative cloche for foods intended to be eaten hot, the device comprising:

- a closed enclosure delimited by a thermally insulative peripheral wall having an access door and shaped to contain and to support the trays with their insulative cloche,
- a refrigerator unit adapted to maintain the enclosure at an appropriate refrigeration temperature for storage of the food,
- a heat source housed in the inside face of the cloche and/or the first part of the tray and adapted selectively to heat the interior space between the cloche and the tray and the food that it contains,
- transmission means for transmitting to the heat source energy from an external energy supply provided with control means to assure programmed heating of the interior space and the food that it contains shortly before the food is eaten,
- wherein the dimensions and the shape of the enclosure are such that it can contain and support only one or two meal trays with their insulative cloche, constituting an individual meal refrigering and heating unit placed in the immediate proximity of the user so as to be directly accessible by the user at meal times.

An individual unit in accordance with the invention defines a single compartment that can be used to refrigerate foods and that can be used simultaneously as an oven to heat foods. Important additional advantages result from the particular position of the heat source the volume to be heated is small, so reducing energy consumption for simultaneous heating and cooling; the enclosure structure is simplified because no intermediary insulative partitions are needed; maintenance and cleaning are facilitated.

To improve the distribution of heat in the interior space between the cloche and the tray containing the foods to be heated and simultaneously to reduce the heating of the remainder of the enclosure containing the foods to remain cold, the device is such that:

- the cloche comprises a thermally insulative external layer and a metallic bottom diffusion layer that conducts heat,
- the tray comprises a thermally insulative basic structure forming the peripheral and bottom outside surface and covered, at least in the part receiving the cloche with a thermally conductive metallic top diffusion layer,
- the top diffusion layer of the tray comes into contact with the bottom diffusion layer of the cloche at the periphery of the interior space.

It is important to keep the food intended to be eaten cold cool during heating. To this end, cooling is substantially enhanced by housing the heat source in the inside face of the cloche.

Cooling of the food intended to remain cold is further enhanced by covering the exposed face of the diffusion layers with a layer of black polytetrafluoroethylene or black enamel.

Heating of food is enhanced by providing at least two orifices in opposite areas of the lower part of the peripheral wall surrounding the interior space. The orifices can be notches or deformations in the edge where the cloche is in contact with the tray body.

In a first embodiment, the heat source is an intermediate plate of a material that can heated by magnetic induction in contact with the diffusion layer of the cloche and the enclosure is provided with a magnetic field generator disposed near the top face of the cloche.

In a second embodiment of the invention, the heat source is an electrical element electrically connected to two external terminals of the cloche, the enclosure comprising corresponding contact terminals adapted to come into contact with the external terminals of the cloche to assure the electrical connection of the element to an external electrical power supply when the tray is supported in the enclosure.

Improved thermal insulation between the hot food area and the cold food area is obtained by placing the heat source on the inside face of the cloche. Additionally, air extractor means can be provided in the enclosure area containing the first part of the meal tray, outside the cloche. Additionally, a retractable transverse flap can be provided which is adapted to be disposed between the hot first part of the tray and the cold second part of the tray.

The cloche can be either a separate removable or liftable component, placed on the first part of the tray, or a component attached to the enclosure and associated with drive means procuring relative vertical displacement of the cloche and the tray towards and away from each other.

Placing the heat source on the inside face of the cloche reduces heating of the tray and thus facilitates handling it after heating. It is also advantageous to place the energy transmission means in the part of the enclosure at the greatest distance from the door, so that the user tends naturally to grasp the cold second part of the tray after heating, with no risk of burns.

In accordance with the invention, a device for the complete institutional distribution of meals can include:

- a plurality of individual trays having a first part shaped to carry a meal portion intended to be eaten hot and a second part shaped to carry a meal portion intended to be eaten cold, with a thermally insulative removable cloche adapted to be fitted over the first part of the tray to cover the meal portion intended to be eaten hot,
- transport means having an enclosure shaped to contain an appropriate number of individual trays, carrying the meals and surrounded by a thermally insulative wall provided with a loading and unloading door,
- a plurality of individual meal refrigering and heating units.

Preferably, in accordance with the invention, the transport means comprise at least one manually propelled cart comprising a frame on castors supporting the thermally insulative peripheral wall surrounding an uncompartmented enclosure having lateral slides to support a stack of individual trays.

Preferably, the individual unit is generally parallelepiped shape with an access door closing one smaller side, with lateral slides on the inside face of the larger sides, the distance between the larger sides being suitable for lengthwise insertion of the individual tray or trays, lateral wide rims of which rest on the lateral slides.

In one advantageous embodiment, the individual unit is carried by a frame on castors and is generally parallelepiped shape with appropriate dimensions to constitute a bedside table placed beside a hospital bed.

A method in accordance with the invention for institutional distribution of meals is such that:

a) the meals are prepared and disposed on individual trays in an institutional kitchen, the individual trays having a first individual tray part carrying the meal portion intended to be eaten hot, the individual trays having a second individual tray part carrying the meal portion intended to be eaten cold, said first individual tray part being adapted to receive a thermally insulative cloche, b) the individual trays carrying meals are transported in the thermally insulative enclosure of a thermally insulated transport means to the place where the meals are to be eaten, c) the individual trays carrying meals are distributed into individual food refrigering and heating units provided in each place where meals are to be eaten and directly accessible to the persons eating said meals, d) the meal portions intended to be eaten hot are selectively heated on the individual trays placed in the individual units using individual heat sources to heat the food under the cloches.

All trays to be distributed from an institutional kitchen can be contained in a refrigerated carrier or cart and the tray is then inserted without interrupting its refrigeration into the individual unit in accordance with the invention.

The invention also has the advantage that, when the foods have been eaten, the user can put the tray and the leftovers back in the enclosure of the individual unit to keep them cool until collected by the distribution personnel. As applied to hospitals, for example, a device of this kind very significantly reduces the risk of bacterial growth whilst freeing the personnel from the meal times constraint and allowing greater flexibility in individual meal times.

Other objects, features and advantages of the present invention will emerge from the following description of particular embodiments given with reference to the appended drawings.

BRIEF DESCRIPTION OF THE DRAWINGS

FIG. 7 is a righthand side view in longitudinal section of an individual unit constituting a second embodiment of the present invention;

FIG. 8 is a front partially cross-sectional view of the individual unit from FIG. 7;

FIG. 9 is a lefthand side view in longitudinal section of the individual unit from FIG. 7;

DETAILED DESCRIPTION OF THE PREFERRED EMBODIMENTS

Figure 3:
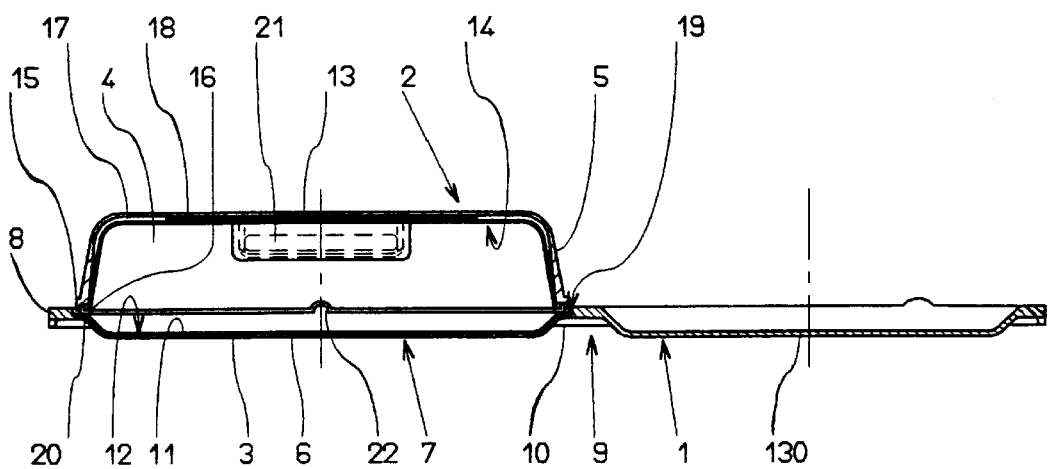
FIG. 3 is a front cross-sectional view of a meal tray suitable for use in a device in accordance with the present invention.

As shown in FIG. 3, foods from an institutional kitchen can be prepared on a tray 1 provided with a top removable cloche 2 that can be placed over at least a first part 3 of the tray in order to delimit between the tray 1 and the cloche 2 an interior space 4 surrounded by a peripheral wall 5 and adapted to contain food to be heated.

In the embodiment shown in FIGS. 1 through 6, the tray body 1 comprises a plastics material basic structure 6 forming a bottom outside surface 7 and rims 8. In the embodiment shown, the basic structure 6 is in two parts, each of which is generally cup-shaped, namely the first part 3 adapted to receive the cloche 2 covering the food to be heated and a second part 130 adapted to support food to remain cold.

The two cup-shaped parts 3 and 130 of the tray body 1 are linked by a raised intermediate area 9 having stiffener members 10 such as ribs.

The basic structure 6 of the tray body has, in the first part 3 receiving the cloche 2, a top diffusion layer 11 of a metal that is a good conductor of heat, for example aluminum, attached to the basic structure 6. The top diffusion layer 11 can advantageously be covered, at least on its exposed face 12, with a layer of black polytetrafluoroethylene or black enamel, to encourage radiation of heat towards the food.

In the embodiment shown, the cup-shaped second part 130 of the tray body adapted to receive food to remain cold has no metallic top layer.

As can be seen again in this FIG. 3, the cloche 2 comprises a thermally insulative plastics material outer layer 13 to which is attached a bottom diffusion layer 14 of a metal that is a good conductor of heat, such as aluminum, the exposed face of which can advantageously be covered with black polytetrafluroethylene or black enamel.

The outer layer 13 and the diffusion layer 14 of the cloche 2 are preferably joined together at their respective bottom peripheral edges 15 and 16, leaving a layer of air 17 between the outer layer 13 and the diffusion layer 14 in the central part of the cloche 2. The air layer 17 contributes to thermal insulation of the cloche, preventing thermal diffusion to the exterior and excessive heating of the outer layer 13 of the cloche 2 and encouraging heating of the diffusion layer 14.

In the embodiment shown in FIG. 3, an intermediate hotplate 18 is placed in the central area of the top wall of the cloche 2, for example between the outside layer 13 and the bottom diffusion layer 14, fixed to the top face of the diffusion layer 14 in order to transmit to the latter the heat that it generates. The hotplate 18 can be a disk fixed to the top face of the bottom diffusion layer 14, for example, said bottom diffusion layer 14 being generally plane in the central area of the cloche 2.

Alternatively, an annular hotplate can be disposed at the periphery of the cloche 2, that is to say fixed to the lateral peripheral face of the bottom diffusion layer 14.

The basic structure 6 of the tray body 1 includes a flat top peripheral rim 8 and the top diffusion layer 11 of the tray itself has a visible flat top peripheral rim 19. The top peripheral rim 19 is then adapted to support the bottom edge of the cloche 2.

The bottom peripheral edge 16 of the bottom diffusion layer 14 in the cloche 2 has simultaneously a plane bottom peripheral facet 20 which bears on the top peripheral rim 19. Accordingly, the top diffusion layer 11 of the tray 1 comes into contact with the bottom diffusion layer 14 of the cloche 2 at the periphery of the interior space 4. This contact enables the transmission of heat by thermal conduction from the hotplate 18 all around the food to be heated.

Concave deformations like the deformation 21 can be provided on the lateral face of the cloche 2 to constitute handles for gripping.

At least two orifices can advantageously be provided in opposite areas of the bottom part of the peripheral wall 5 around the interior space 4. In the embodiment shown in FIG. 3, for example, one of two orifices 22 can be seen, in the form of a notch or a deformation in the rim of the cloche 2, or rim adapted to contact the tray body 1. The notches or deformations shown have a semi-circular section with a radius of about 4 mm. Alternatively, similar notches or deformations can be provided in the edge of the tray body 1 on which a plane bottom rim of the cloche 2 rests.

Figure 1:
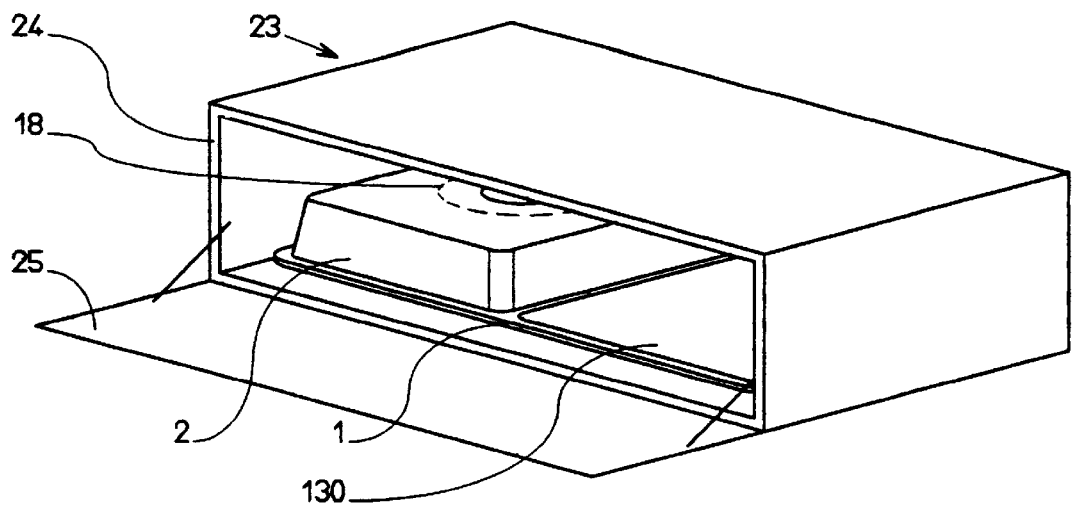
FIG. 1 is a perspective view of a device constituting a simplified embodiment of the present invention.
Figure 2:
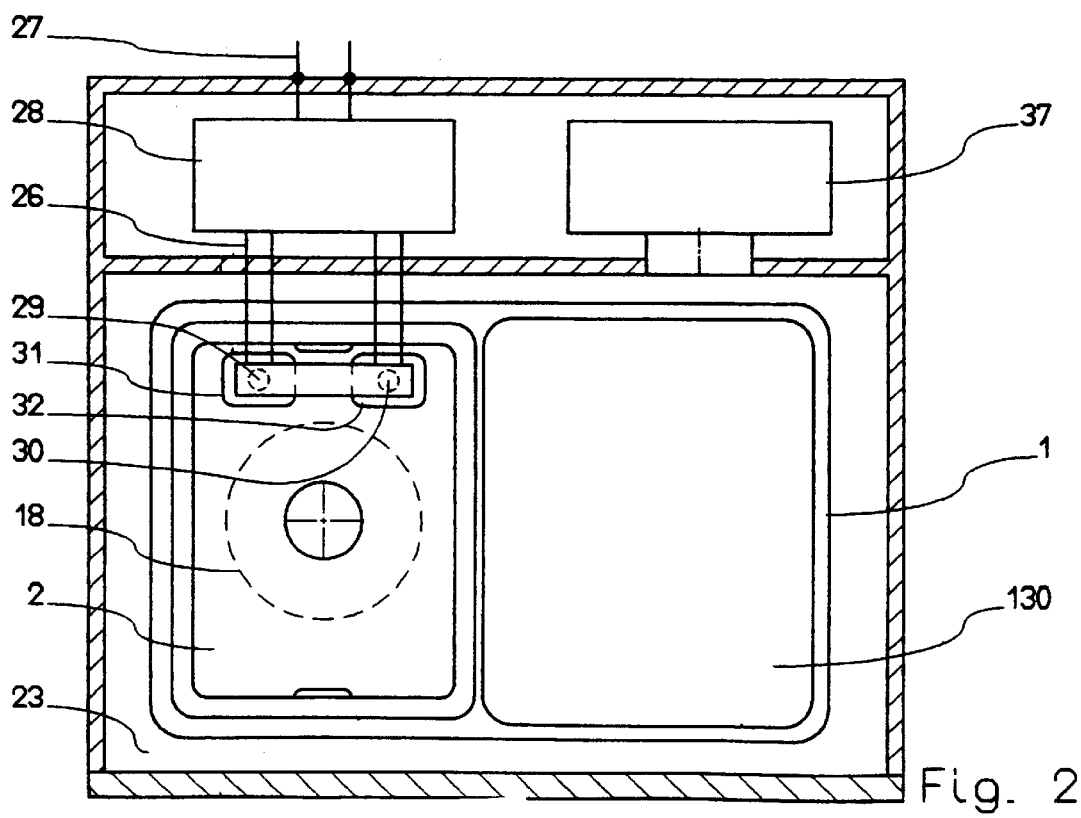
FIG. 2 is a diagrammatic top sectional view of the device from FIG. 1.

FIGS. 1 and 2 show a device constituting a simplified first embodiment of the invention, comprising a closed individual enclosure 23 delimited by a thermally insulative peripheral wall 24 provided with an access door 25 and sized to receive and to contain at least one meal tray 1 with its cloche 2. As shown in FIG. 2, a refrigerator unit 37 keeps the enclosure 23 at an appropriate refrigering temperature for storage of the food on the meal tray 1. Transmission means 26 transmit to the hotplate 18 energy from an external energy source such as an electrical power supply line 27 with control means 28. The control means 28 are adapted to supply power to the heat source 18 for programmed heating of the interior space 4 of the tray 1 and the food that it contains for an appropriate period before the food is eaten.

The hotplate 18 constitutes a heat source housed on the inside face of the cloche 2 or of the tray 1 and adapted to heat selectively the interior space 4 between the cloche 2 and the tray 1 and the food that it contains.

In a first embodiment the hotplate 18 is made of a material that can be heated by magnetic induction and is in contact with the diffusion layer 14 of the cloche 2. In this case, the enclosure 23 is provided with a magnetic field generator disposed near the top face of the cloche 2 and controlled by the control device 28.

In a second embodiment, the hotplate 18 is an electrical element that must be electrically connected to the external electrical power supply 27 by the control device 28. In this case the enclosure 23 has two contact terminals 29 and 30, shown in more detail in FIGS. 4 and 5, and adapted to come into contact with two external terminals 31 and 32 of the cloche 2, preferably on the top face of the cloche 2. The external terminals 31 and 32 of the cloche can be two portions of the top surface of the cloche made from an electrically conductive material, insulated from each other and electrically connected to the two terminals of the hotplate 18. In the embodiment shown in FIGS. 4 and 5, the contact terminals 29 and 30 can be metal lugs sliding vertically in corresponding housings and spring loaded downwards by springs 33 and 34 in order to bear elastically on the respective external terminals 31 and 32 of the cloche.

The inside shape and dimensions of the enclosure 23 are such that it can receive the tray 1 and guide it into a fully engaged position shown in FIG. 1. In this fully engaged position the tray 1 is supported by the enclosure 23 and the external terminals 31 and 32 of the cloche 2 are in contact with the corresponding contact terminals 29 and 30 of the enclosure 23 to make the electrical connection to the hotplate 18. The tray 1 can be guided in the enclosure 23 by lateral slides, horizontal shelves or any other means for procuring the fully engaged position of the tray.

Figure 4:
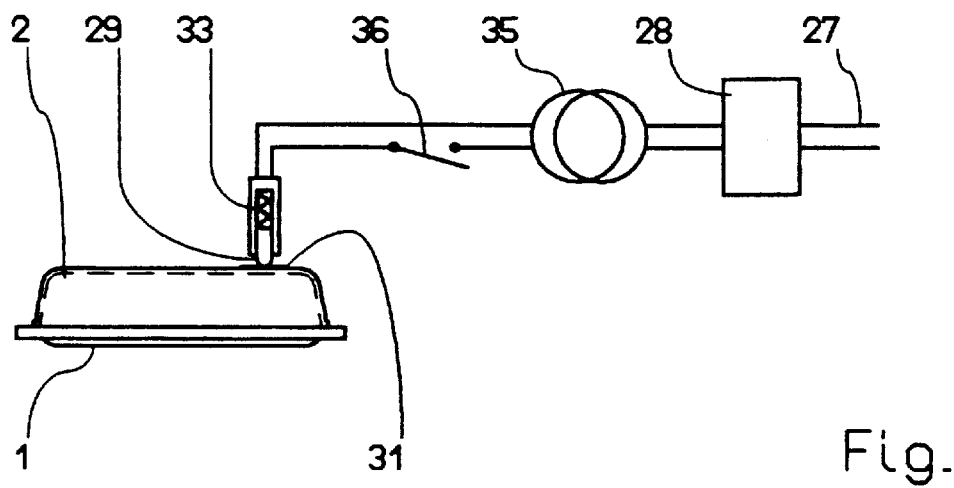
FIG. 4 is a schematic illustration of a mean for transmitting energy in one embodiment of the present invention.
Figure 5:
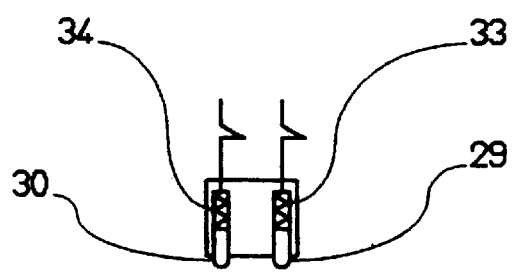
FIG. 5 is a view showing a detail of a fixed station in the FIG. 4 embodiment.
Figure 6:
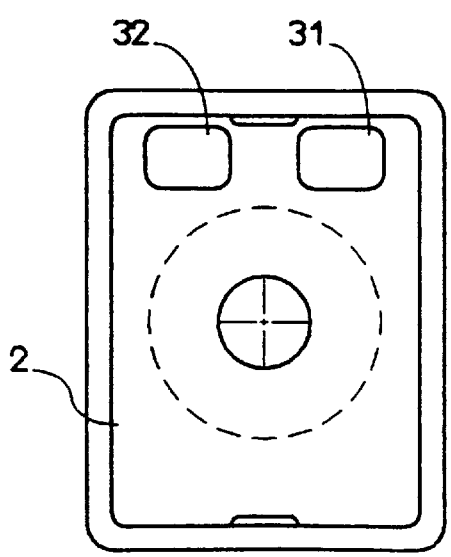
FIG. 6 is a diagrammatic top view showing the connecting terminals of the device from FIG. 4.

As shown in FIG. 4, an electrical transformer 35 can be connected between the control device 28 and the contact terminals 29 and 30 in order to apply a 24 volt supply to the contact terminal 29 and 30. A switch 36 is connected in series between at least one of the contact terminals 29 and 30 and the external electrical power supply 27 and is controlled by a sensor sensing the position of the door 25 so that the switch 36 is open when the door 25 is open and closed when the door 25 is closed. Accordingly, if the door 25 is open or half-open, the electrical power supply to the contact terminals 29 and 30 is interrupted.

In the embodiment shown in FIG. 1, the enclosure 23 is shaped to receive and support a single meal tray 1. Alternatively, the enclosure 23 can be shaped to receive and support two meal trays. In either case the enclosure 23 constitutes an individual food refrigering and heating unit which can be placed near a bed in a hospital room, for example.

The control device 28 is adapted to supply power to the hotplate 18 for a particular period before the meal is eaten. For example, the user can program the time at which heating starts, the time for which heating continues and possibly the power setting at which heating is carried out. Alternatively, the control device 28 can be remote controlled.

When the meal has been eaten, the user can replace the meal tray in the enclosure 23 which keeps the tray and everything on it refrigerated.

Figure 10:
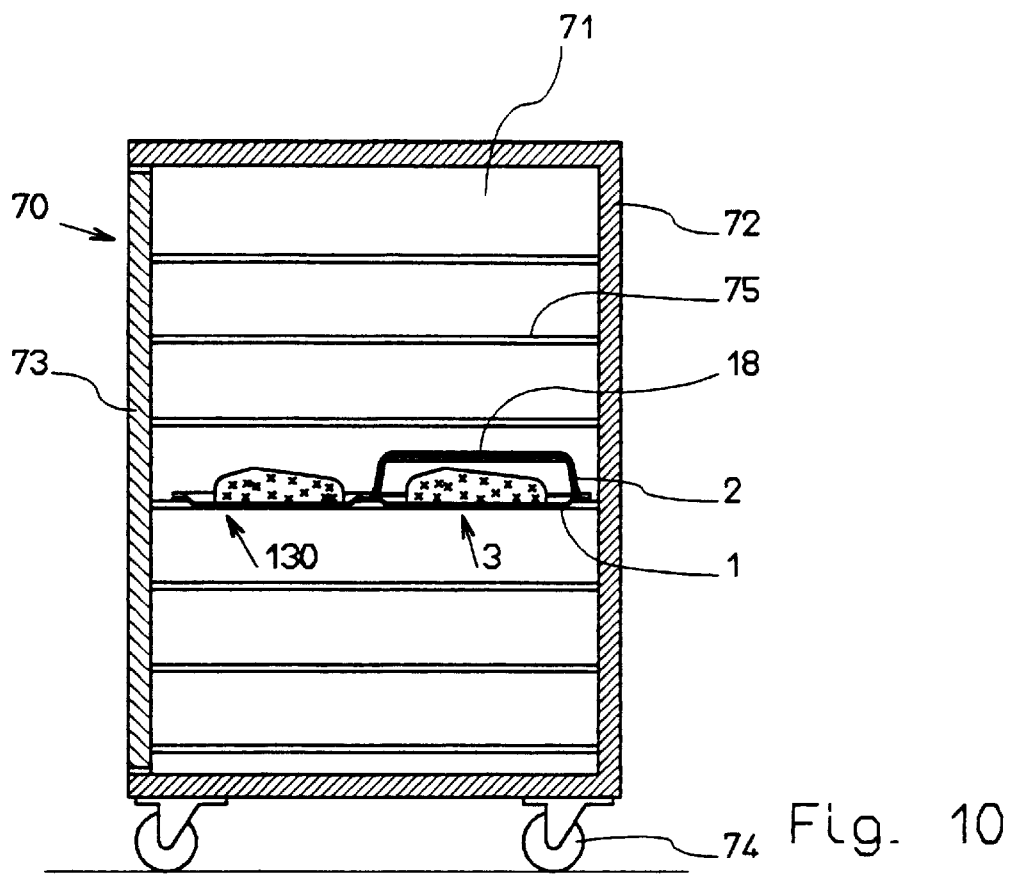
FIG. 10 is a righthand side view in longitudinal section of a mobile cart for distributing meals in one embodiment of the present invention.

The device in accordance with the invention can advantageously further comprise transport means such as a cart 70 shown in FIG. 10 having an enclosure 71 shaped to contain an appropriate number of individual trays like the tray 1 carrying meals and surrounded by a thermally insulative peripheral wall 72 provided with a loading and unloading door 73.

In this embodiment shown in FIG. 10, the transport means comprise a manually propelled cart 70 comprising a frame 74 on castors supporting the thermally insulative peripheral wall 72 surrounding the non-compartmented enclosure 71 which has horizontal lateral slides like the slide 75 to support a stack of individual trays like the tray 1. The cart 70 therefore has a particularly simple and low-cost structure and is adapted to keep the trays and the meals that it contains refrigerated while it is moved from the institutional kitchen in which the trays are loaded and the places where the meals are eaten, where the trays are removed from the cart 70 and placed in local individual units directly accessible to the user. The thermal insulation capacity of the peripheral wall 72 is chosen to keep the food on the meal trays contained in the cart 70 at a temperature of 3° C. for a particular time period, for example one hour.

The individual trays 1 can be inserted lengthwise into the cart 70, as shown in FIG. 10. Alternatively, the individual trays 1 could be inserted widthwise into the cart 70.

In the embodiment shown in FIGS. 7 through 9, the individual food refrigering and heating unit 23 is carried by a frame 40 on castors and is generally parallelepiped shape with appropriate dimensions to constitute a bedside table placed beside a hospital bed. In this case the individual unit 23 can contain a single individual tray 1. An individual unit 23 can nevertheless be provided which is adapted to contain two individual trays 1 placed one on top of the other, for two successive meals.

In this embodiment, the enclosure of the individual unit 23 is itself of parallelepiped shape with its door 25 closing a smaller side and with lateral slides 41 on the inside face of the larger sides, these larger sides 42 and 43 being at a distance from each other suitable for the lengthwise insertion of the individual tray or trays 1 with their wide lateral rims like the rim 44 resting on the slides 41.

The inside height H of the enclosure of the individual unit 23 is preferably greater than the height of the individual tray or trays 1 with the cloches 2 on them and the lateral slides 41 which support the trays are in the upper part of the enclosure to leave a bottom enclosure space and shaped to contain other items to be refrigerated, such as drinks.

As in the previous embodiment, the heat source 18 is an electrical element electrically connected to two external terminals 31 and 32 of the cloche 2 and the energy transmission means 28 comprise two corresponding contact terminals 29 and 30 adapted to come into electrical contact with the external terminals 31 and 32 of the cloche 2 in order to connect the element 18 to an external electrical power supply such as the mains electrical power supply when the individual tray 1 is supported in the enclosure of the individual unit 23.

In this variant the contact terminals 29 and 30 can be moved between a deployed position in which they come into contact with the external terminals 31 and 32 of the cloche 2 and a retracted position in which they are retracted inside the interior space of the enclosure. Spring loading means such a spring, not shown in the figures, spring load the contact terminals 29 and 30 towards the retracted position. When energized simultaneously with the contact terminals 29 and 30, an electromagnetic 45 moves said contact terminals 29 and 30 to a deployed position to make the electrical connection to the element 18.

As a safety measure, the electromagnetic 45 is energized simultaneously with the contact terminals 29 and 30 so that the contact terminals 29 and 30 are moved to the deployed position only when they are live.

The individual unit preferably further comprises a sensor 46 sensing the position of the door 25 and preventing supply of power to the contact terminals 29 and 30 when the door 25 is open. Moreover, when the door 25 is open the sensor 46 sensing the position of the door 25 disables the supply of power to the electromagnet 45, so that opening the door 25 automatically retracts the contact terminals 29 and 30 out of reach of the user, assuring enhanced safety during cleaning of the interior of the enclosure or any other action of the user inside the enclosure.

The energy transmission means such as the contact terminals 29 and 30 are preferably disposed in the part of the enclosure at the greatest distance from the door 25, this part at the greatest distance constituting the heating area of food, enabling to heat the portion of the meal to be eaten hot. In this way, after opening the door 25, the user grasps the cold part of the individual tray 1.

Furthermore, to reduce the risk of heating of the meal portion 130 intended to be eaten cold, a transverse top flap 47 can be provided, pivoting freely about a transverse top hinge pin 48 at an intermediate position on the top wall 49 of the enclosure. The transverse top flap 47 defines a retractable mobile separator wall that is pushed back by the cloche 2 when the individual tray 1 is inserted and removed. The transverse top flap 47 thermally insulates the heating area from the area intended to remain cold.

In the embodiment shown in FIGS. 7 through 9, the individual unit 23 further includes a top part having a drawer 50 occupying part of the space at the level of the electromagnet 45 and the retractable contact terminals 29 and 30. The refrigerator unit 37 can advantageously be located in the lower portion and feed a cooling serpentine 51 in at least one of the larger sides of the peripheral wall 24.

FIG. 9 additionally shows a fan 52 for extracting hot air disposed in the upper part of the enclosure, in its rear wall, to extract the hot air and the steam produced by heating the food, in particular at the end of the heating step. The fan 52 can be energized at the end of heating step.

Figure 11:
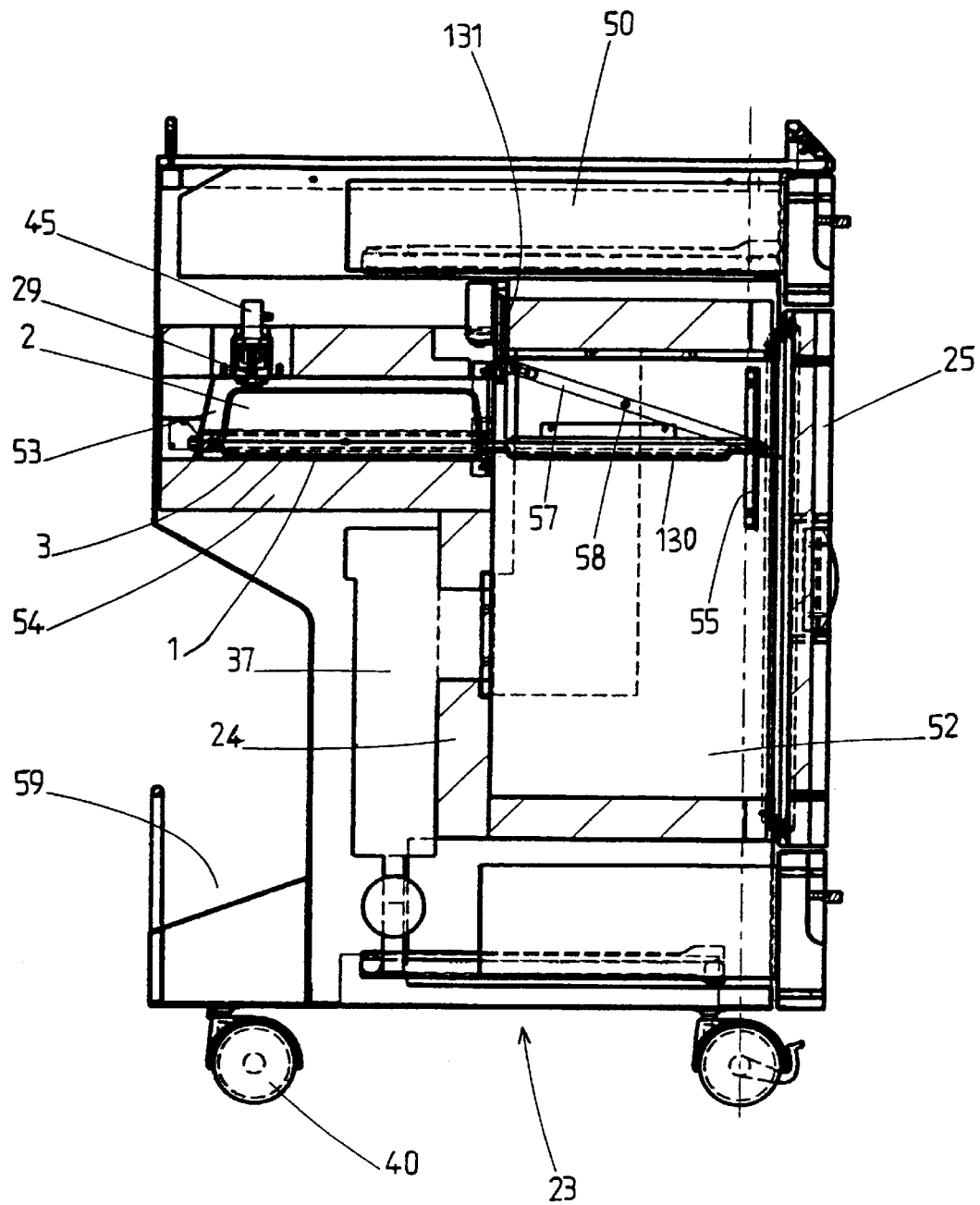
FIG. 11 is a lefthand side view in longitudinal section of an individual unit constituting a third embodiment of the present invention.

FIG. 11 shows another embodiment of the individual meal refrigering and heating unit 23 in accordance with the present invention. This third embodiment has substantially the same features as the second embodiment shown in FIGS. 7 through 9. To avoid repetition, FIG. 11 uses the same reference numbers to designate the same items corresponding to the embodiment of FIGS. 7 through 9.

Accordingly there is an individual unit 23 of generally parallelepiped shape mounted on wheels 40 with a door 25, a drawer 50, adapted to contain a tray 1 and a cloche 2, with an electromagnet 45 for moving contact terminals like the terminal 29, and a refrigerator unit 37.

A first feature of this third embodiment resides in the disposition of the interior space. The refrigerated part of the individual unit 23 has a front part 52 occupying all of the height behind the door 25 with a top portion to receive the cold part 130 of the tray 1 and a bottom area constituting a refrigerated compartment to receive drinks or other products to kept cold. The rear half of the individual unit 23 has a top refrigerated portion 53 shaped to receive the first part 3 of the tray 1 and the cloche 2, the top refrigerated portion 53 being surrounded by a thermally insulative wall 54. The refrigerator unit 37 is disposed under the top refrigerated portion 53, in the rear half of the individual unit 23. The relatively compact overall size of the refrigerator unit 37 enables a rear rack 59 to be provided, open towards the rear and towards the top, adapted for storage of various objects such as a hospital bed washbowl.

A second feature of the FIG. 11 embodiment resides in the means for effectively insulating the hot part 3 from the cold part 130 of the tray 1 and locking means for preventing extraction of the tray 1 before the heating period is completed. In the embodiment shown, these means comprise a front flap 55 mobile vertically and disposed just behind the door 25 in the upper area of the front enclosure part 52 to allow or to prevent passage of the tray 1. In its lowered position, the front flap 55 allows the tray 1 to pass and in its raised position the flap 55 prevents the user grasping the tray 1 to remove it from the individual unit 23.

The front flap 55 is mounted on an arm 57 hinged about a transverse pin 58 the other end of which carries a retractable top flap 131 that can be moved between a raised or open position in which it allows the tray and the food to slide in or out and a closed or lowered position in which it is disposed between the first tray part 3 carrying the food intended to be eaten hot and the second tray part 130 carrying the food intended to be eaten cold.

Motor drive means can be provided to move the front flap 55 and the retractable top flap 31 between the open and closed positions and to lock them in the closed position.

In the embodiments explicitly described, the cloche 2 is a separate removable member placed on the first part 3 of the tray 1.

Alternatively, a cloche 2 can be provided that is attached to the enclosure of the individual unit 23, with drive means for relative vertical movement of the cloche 2 and of the tray 1 towards or away from each other to close and to open the compartment containing the food intended to be eaten hot. In this case, before heating starts, the cloche 2 is raised, allowing cold air to circulate throughout the enclosure around the food; during heating the cloche 2 is lowered into contact with the tray 1. It is raised just before the tray is withdrawn by the user in order to eat the food.

In all cases, temperature sensors and recording means can be provided in the individual unit 23 to record how the temperature of the food on the tray 1 changes. This provides a simple and particularly reliable means of monitoring compliance with hygiene conditions.

The present invention is not limited to the embodiments explicitly described but includes variants and generalizations thereof within the scope of the following claims.

What is claimed is:

1. A method for institutional distribution of meals, said method comprising the steps of:

a) preparing and disposing meals on individual trays in an institutional kitchen, said individual trays having a first individual tray part carrying a meal portion intended to be eaten hot, said individual trays having a second individual tray part carrying a meal portion intended to be eaten cold, said first individual tray part being adapted to receive a thermally insulative cloche, b) transporting said individual trays carrying meals in a thermally insulative enclosure of a thermally insulated transport means to the place where said meals are to be eaten, c) distributing said individual trays carrying meals into individual food refrigerating and heating units provided in each place where meals are to be eaten and directly accessible to the person eating said meals, and d) selectively heating said meal portions intended to be eaten hot on said individual trays placed in said individual units using individual heat sources to heat said food under said cloches.

2. The method of claim 1 further comprising the step of maintaining said meals in said thermally insulative enclosure of said thermally insulated transport means at a temperature less than about 3° C.

3. The method of claim 1 further comprising the step of recording the change of temperature of the meals on the individual trays inside the individual units.

4. A method for distributing a meal, having a portion intended to be eaten hot and a portion intended to be eaten cold, from a remote location to a place where the meal is eaten, the method comprising the steps of:

a) placing the meal on a tray at the remote location and covering the portion of the meal intended to be eaten hot with a cover;

b) transporting the tray carrying the meal from the remote location to the place where the meal is eaten in a thermally insulative enclosure;

c) moving the tray carrying the meal from the thermally insulative enclosure to an enclosure of a refrigerating and heating unit positioned where the meal is eaten;

d) refrigerating the tray carrying the meal in the enclosure of the refrigerating and heating unit; and e) selectively heating the portion of the meal intended to be eaten hot using a heat source connected to the cover.

5. The method recited in claim 4, said refrigerating step comprises using a refrigeration unit to maintain a refrigeration temperature for storage of the tray carrying the meal.

6. The method recited in claim 4, said selectively heating step comprises transmitting energy from a source to the heat source connected to the cover.

7. The method recited in claim 6, said selectively heating step further comprises transmitting heat by magnetic induction from a magnetic field source.

8. The method recited in claim 4, said selectively heating step comprises connecting the heat source of the cover to a power supply.

9. The method recited in claim 8, said selectively heating step further comprises energizing the power supply to heat the heat source for a predetermined period before the meal is eaten.

10. The method recited in claim 4, said method being adapted for distributing a plurality of meals, said transporting step comprises transporting a plurality of trays carrying the meals and said moving step comprises moving a plurality of trays carrying the meals to the enclosure of the refrigerating and heating unit.

11. The method recited in claim 4, said transporting step comprises maintaining the meal contained in the thermally insulative enclosure at a temperature of about 3° C.

12. The method recited in claim 4, said selectively heating step comprises deploying a power supply into contact with the heat source of the cover.

13. The method recited in claim 12, said selectively heating step further comprises retracting the power supply from contact with the heat source of the cover.

14. The method recited in claim 4, further comprising the steps of sensing the position of an access door on the refrigerating and heating unit and preventing the step of selectively heating when the access door is open.

15. The method recited in claim 4, said moving step comprises positioning the tray so that the portion of the meal intended to be eaten hot is farthest from an access door on the refrigerating and heating unit.

16. The method recited in claim 4, further comprising the step of insulating a heating area of the refrigerating and heating unit.

17. The method recited in claim 4, further comprising the step of extracting heated air from the enclosure of the refrigerating and heating unit.

18. The method recited in claim 17, said extracting step comprises energizing a fan after said selectively heating step.

19. A method for distributing meals, each having a portion intended to be eaten hot and a portion intended to be eaten cold, from a remote location to places where the meals are eaten, the method comprising the steps of:

a) placing each of the meals on a tray at the remote location and covering the portion of each meal intended to be eaten hot with a cover;

b) transporting the trays carrying the meals from the remote location to the places where the meals are eaten in a thermally insulative enclosure;

c) moving the trays carrying the meals from the thermally insulative enclosure to an enclosure of a refrigerating and heating unit positioned at each place were the meals are eaten;

d) refrigerating the tray carrying the meal in the enclosure of the refrigerating and heating unit; and e) transmitting energy from a source to the heat source connected to the cover, thereby selectively heating the portion of the meal intended to be eaten hot.

20. The method recited in claim 19, said selectively heating step comprises connecting the heat source of the cover to a power supply.

* * * * *

UNITED STATES PATENT AND TRADEMARK OFFICE
CERTIFICATE OF CORRECTION

| | |
|---|---|
| PATENT NO. : 6,120,819 | Page 1 of 1 |
| DATED : September 19, 2000 | |
| INVENTOR(S) : Violi et al. | |

It is certified that error appears in the above-identified patent and that said Letters Patent is hereby corrected as shown below:

On the Title Page:
[56] References Cited

FOREIGN PATENT DOCUMENTS

"238637"   10/1978       France, should read:
    --2383637-- 10/1978       France Column 12,
Line 49, should read:
--and heating unit positioned at each place where the--

Signed and Sealed this

Nineteenth Day of June, 2001

Attest:

*Nicholas P. Godici*

NICHOLAS P. GODICI
*Attesting Officer*     *Acting Director of the United States Patent and Trademark Office*